(12) United States Patent
Dron et al.

(10) Patent No.: US 7,909,285 B2
(45) Date of Patent: Mar. 22, 2011

(54) FLEXIBLE SUSPENSION FOR TURBINE ENGINE

(75) Inventors: Sebastien Dron, Cachan (FR); Gilles Lucien Fontenoy, Livry sur Seine (FR); Marc Patrick Tesniere, Champcueil (FR)

(73) Assignee: Snecma, Paris (FR)

( * ) Notice: Subject to any disclaimer, the term of this patent is extended or adjusted under 35 U.S.C. 154(b) by 528 days.

(21) Appl. No.: 12/103,258

(22) Filed: Apr. 15, 2008

(65) Prior Publication Data
US 2009/0032673 A1 Feb. 5, 2009

(30) Foreign Application Priority Data

Apr. 16, 2007 (FR) ..................................... 07 02742

(51) Int. Cl.
*B64D 27/00* (2006.01)
(52) U.S. Cl. .......................................... 244/54; 248/557
(58) Field of Classification Search .................... 244/54, 244/55; 248/554, 557
See application file for complete search history.

(56) References Cited

U.S. PATENT DOCUMENTS

| | | | | |
|---|---|---|---|---|
| 2,093,846 | A | * | 9/1937 | Paulsen et al. ................ 248/554 |
| 2,241,139 | A | | 5/1941 | Julien et al. |
| 3,056,569 | A | | 10/1962 | Bligard |
| 4,725,019 | A | * | 2/1988 | White ............................ 244/54 |
| 5,108,045 | A | * | 4/1992 | Law et al. ....................... 244/54 |
| 6,988,692 | B2 | | 1/2006 | Pasquer et al. |
| 7,021,585 | B2 | | 4/2006 | Loewenstein et al. |
| 7,108,224 | B2 | | 9/2006 | Pasquer et al. |
| 7,165,743 | B2 | | 1/2007 | Pasquer et al. |
| 7,267,301 | B2 | | 9/2007 | Dron |
| 7,325,770 | B2 | | 2/2008 | Chevalier et al. |
| 2005/0269446 | A1 | | 12/2005 | Dron |
| 2007/0084191 | A1 | | 4/2007 | Beutin et al. |
| 2008/0067287 | A1 | | 3/2008 | Guibert et al. |
| 2008/0073461 | A1 | | 3/2008 | Guibert et al. |

FOREIGN PATENT DOCUMENTS

| | | |
|---|---|---|
| EP | 0 257 665 A1 | 3/1988 |
| EP | 0 455 355 A1 | 11/1991 |
| GB | 798832 A | 7/1958 |

OTHER PUBLICATIONS

U.S. Appl. No. 11/389,260, filed Mar. 27, 2006, Dron, et al.

* cited by examiner

*Primary Examiner* — Tien Dinh
*Assistant Examiner* — Michael Kreiner
(74) *Attorney, Agent, or Firm* — Oblon, Spivak, McClelland, Maier & Neustadt, L.L.P.

(57) ABSTRACT

A suspension for suspending a turbine engine from the structure of an aircraft is disclosed. The suspension includes a beam with a first element including a first attachment unit which attaches the beam to the structure and a second element including a second attachment unit which attaches to the beam to the turbine engine. The beam further includes a first plate and a second plate. The plates are positioned transversely to the axis of the engine and joined together by a layer of elastomer. The first plate being secured to the first element and the second plate to the second element. This arrangement allows vibration damping between the engine and the structure of the aircraft.

10 Claims, 3 Drawing Sheets

FLEXIBLE SUSPENSION FOR TURBINE ENGINE

BACKGROUND OF THE INVENTION AND DESCRIPTION OF THE PRIOR ART

The present invention relates to the field of turbine engines and is aimed at how these are suspended from the structure of an aircraft.

A turbine engine suspended, for example, from an airplane wing by means of a pylon comprises a forward hard point that reacts loads passing through the intermediate casing in particular and a rear hard point at the exhaust casing. In a statically determinate suspension, the loads are transmitted by link rods suitably distributed between the two fasteners and which work solely in tension/compression. The link rods are fixed, on the one hand, to a beam secured to the structure of the airplane and, on the other hand, to fittings on the engine casing. The fixtures at the ends of the link rods are ball joint connections so that loads can be transmitted only along the axis of the rods. The loads reacted by these fasteners are the engine torque and the loads exerted in the transverse plane of the engine, such as the weight, lateral loads and engine thrust.

In order to reduce the in-structure vibrations and cabin noise caused by the operating of the engine, it is known practice to incorporate vibration isolating means into the attachment systems. For example, patent EP 250659 describes a suspension for suspending a turbine engine from the structure of an airplane that incorporates a transverse shaft between a beam from which the engine is suspended via link rods and the pylon under the wing of the airplane. The transverse shaft is supported by a first pair of isolators at its ends, operating in vertical compression and a second pair operating in transverse compression. The two pairs are independent of one another and may have different coefficients of elasticity. This solution occupies a fair amount of space in the heightwise direction.

Other arrangements are known and are relatively complicated. They are generally applied to systems of the statically indeterminate type. This type of attachment has the main disadvantage that the loadings on the components are not known at each instant. Engineering the isolating means in such an instance is therefore more difficult and subject to uncertainty.

SUMMARY OF THE INVENTION

It is an object of the present invention to produce a suspension for suspending a turbine engine in an aircraft structure that is both of the statically determinate type and incorporates a flexible vibration isolating element, it being necessary for the assembly to remain as compact as possible.

According to the invention, the suspension for suspending a turbine engine from the structure of an aircraft, comprising a beam with a first element accepting means of attachment to said structure and a second element accepting means of attachment to the turbine engine, is one wherein the beam comprises at least a first plate and a second plate, which plates are intended to be positioned transversely with respect to the axis of the engine and joined together by a layer of a flexible and damping material, such as an elastomer, the first plate being secured to the first element and the other plate to the second element.

By virtue of the solution of the invention, the vibration damping means is incorporated into the structure of the beam thus constituting an assembly that is compact in heightwise direction, is of a simple structure, and is statically determinate.

Patent EP 257665 is known and in one particular embodiment, depicted in FIGS. 19 to 22 and in particular in FIG. 22, describes a suspension comprising four vibration isolators consisting of mutually parallel plates joined together by a layer of elastomer and directed vertically parallel to the engine axis. The objective is to use the shearing of the elastomer to damp out vibrations traveling in the vertical plane. This arrangement of the isolators allows the suspension to remain relatively rigid in the plane perpendicular to the engine axis with respect to transverse loads and rotational torque. The solution of the invention differs from this prior art in that all vibrations directed in the transverse plane are damped out with the possibility of creating a maximum active surface area corresponding to the entire surface area of the plates that form the beam, while at the same time remaining very compact in the heightwise direction.

According to another feature, the beam comprises a plurality of mutually parallel plates joined together by the bonding of layers of elastomer, the plates being secured to the first element and to the second element alternately.

The term plurality means that the assembly comprises at least three plates, a central plate connected to one element, and two plates, one on either side thereof, and connected to the other element. The choice of the number of plates is determined by the space available in which to house the assembly, by the damping characteristics that are to be obtained and also by production constraints. In particular, for the same amount of space occupied, manufacture is adapted in such a way as to obtain the highest possible number of layers of elastomer and of plates. If, on the other hand, there is no limit on the amount of space available, then a solution with an optimum cost of manufacture for a maximum number of elements will be sought.

The plates according to one advantageous embodiment may be produced independently and bolted together.

According to another feature, the plates have passing through them at least one rod parallel to the axis of the engine, a clearance being left between the plates and the rod. Thus, the rod transmits load perpendicular to the engine axis when the first plates have shifted relative to the second plates. The beam comprises one or two rods. This or these two rods react load, particularly if a damping element should fail or in the event of a substantial shifting. In fact, just one rod is provided when the suspension has no means of reacting load associated with engine torque about the engine axis, these loads being reacted by another suspension.

This way of isolating vibrations is particularly well suited to a suspension of the statically determinate type in which the means of attachment to the turbine engine comprises at least one link rod articulated by a ball joint connection to the second element of the beam. In general, the suspension comprises two link rods for reacting transverse load and one link rod, as appropriate, for reacting torque.

According to another feature, the layer of elastomer between two adjacent plates is prestressed. This arrangement allows the elastomeric material never to work in depression.

BRIEF DESCRIPTION OF THE DRAWINGS

One nonlimiting embodiment of the invention will now be described with reference to the attached drawings in which.

DESCRIPTION OF THE PREFERRED EMBODIMENT

Figure 1:
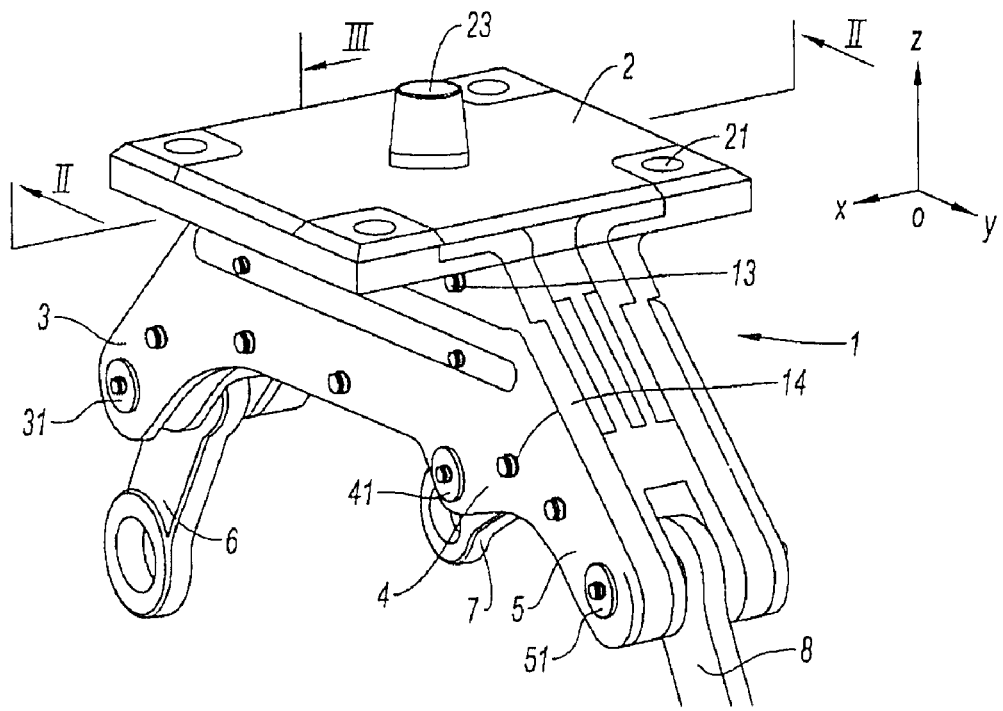
FIG. 1 depicts a suspension according to the invention viewed in perspective.

FIG. 1 shows a depiction in isometric projection of a suspension according to the invention and which constitutes one of the means of attaching a turbine engine to the structure of an aircraft. The turbine engine is a turbojet or turboprop engine. It is attached for example to the underside of an airplane wing using a pylon. However, the invention applies to the attachment to any element of the structure, including the fuselage, in which case the suspension is usually not vertical but horizontal for a lateral attachment.

The suspension comprises a beam 1 with a first element which allows for attachment to the structure of the aircraft. The first element in this example consists of an upper platform 2 of rectangular or square shape pierced with holes 21 via which the platform is attached to the structure of the aircraft. The platform is attached to the structure by attachment means, not visible, such as bolts slipped into the holes 21. A central stud 23 secured to the platform cooperates with the structure of the aircraft and reacts shear loads between the suspension and the structure.

The beam is of elongate overall shape. It is positioned crossways with respect to the axis of the engine. This is the axis OX on the frame of reference associated with FIG. 1. The axis OZ is the vertical axis and the axis OY is the transverse axis. It comprises a second element that accepts means of attachment to the turbine engine. This second element here consists of the three arms 3, 4 and 5 which extend downward away from the platform 2. Each of the arms has a transverse slot open downward and has passing axially through it a spindle 31, 41 and 51 supporting a link rod 6, 7 and 8 respectively. The link rods are articulated to their spindle by a ball joint connection. This connection allows the link rod to pivot about the spindle 31, 41 and 51 and also in the other two directions, within the limits set by the clearance left between the link rod and the slot that accommodates it.

The engine is attached to the beam via the link rods 6, 7 and 8 which have axial bores for the passage of spindles, not depicted, mounted in fittings secured to the engine casing. The two link rods 6 and 8 make an angle between them and react loads in the directions OY and OZ. The link rod 7 positioned between the other two, and in combination therewith, reacts loads associated with engine torque. If torque is reacted by some other suspension then this rod may be omitted.

The assembly described hereinabove is conventional and forms part of the prior art.

Figure 2:
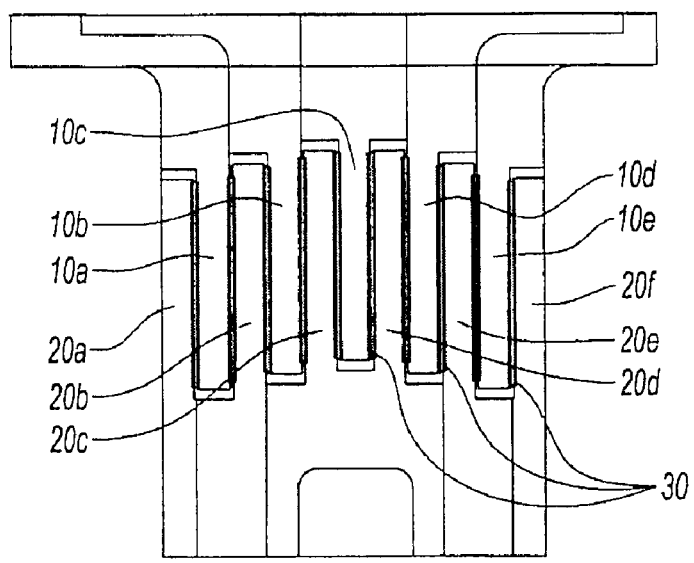
FIG. 2 is a section on II-II of the suspension of FIG. 1.
Figure 3:
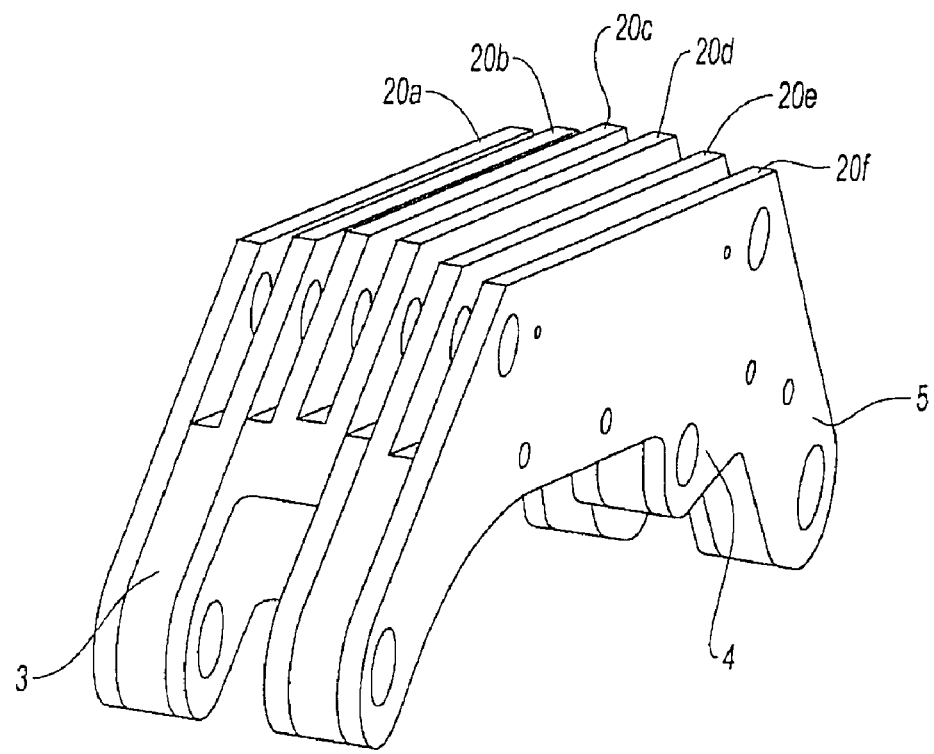
FIG. 3 is a section on III-III of the suspension of FIG. 1.
Figure 4:
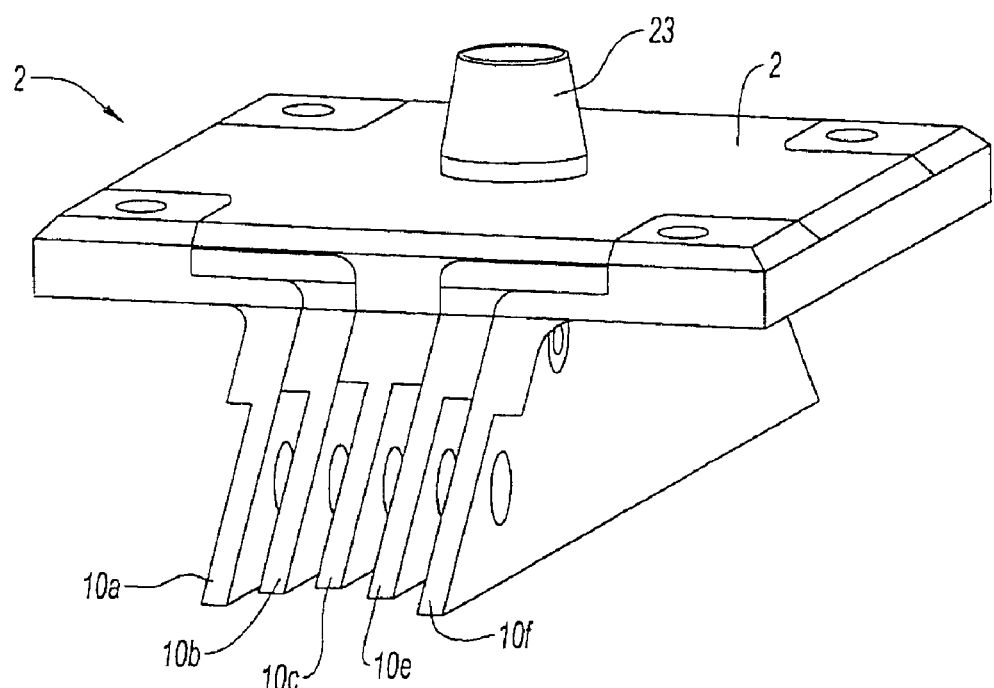
FIG. 4 shows an assembly of first plates constituting part of the suspension in FIG. 1.
Figure 5:
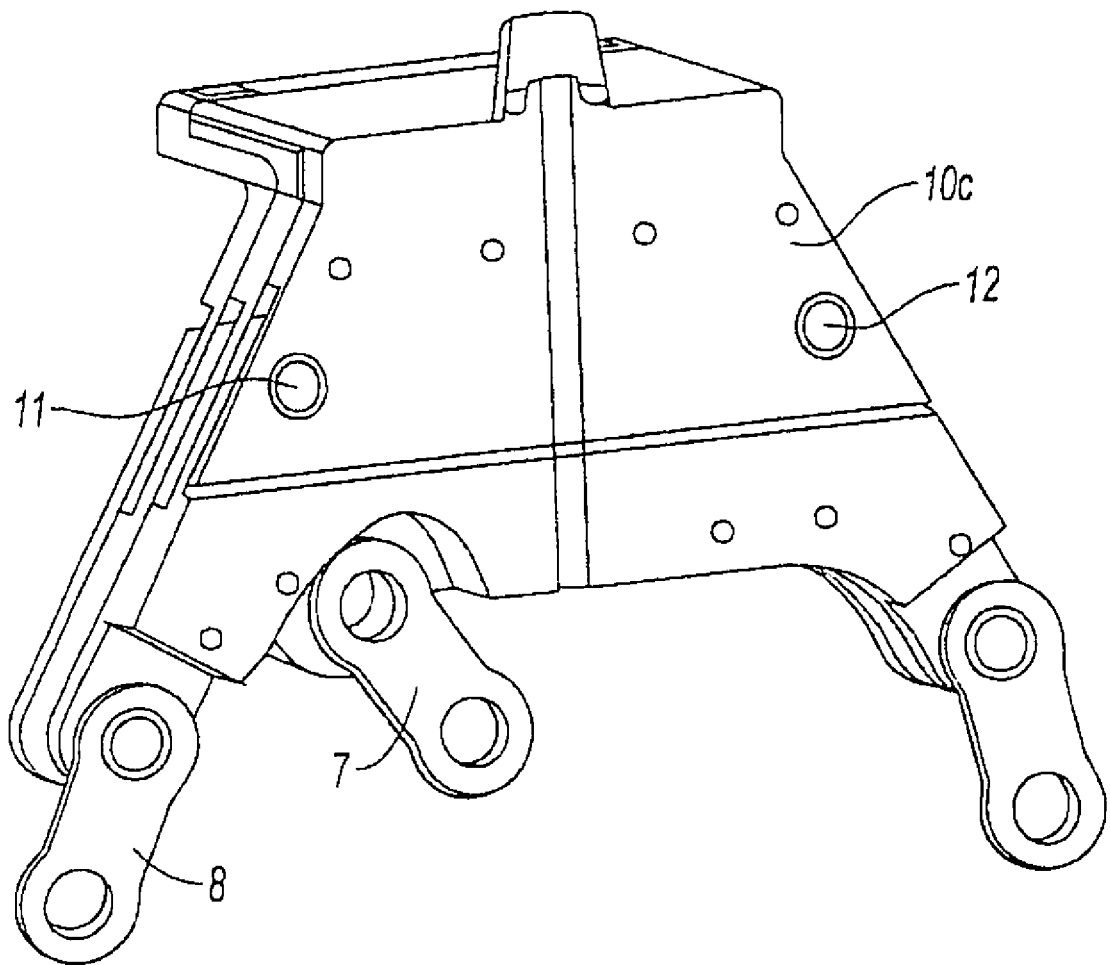
FIG. 5 shows an assembly of second plates constituting the complementary part of the suspension of FIG. 1.

The invention consists in modifying the structure of the beam 1 to make it flexible in the transverse plane. This structure is detailed in FIGS. 2 to 5. FIG. 2, which is a cross section through the beam on a vertical plane, shows that this beam consists of a plurality of plates: first plates 10a, 10b 10c, 10d, 10e, and second plates 20a, 20b, 20c, 20d, 20e, 20f. The first plates 10 are nested between the second plates 20. A space is left between the adjacent plates and this space is occupied by an elastomeric material. There are as many layers 30 of elastomeric material as there are gaps between the first and second plates 10 and 20. The elastomeric layers are bonded to the plates, the assembly forming a laminated structure. The first plates 10 are secured to said first element of the beam that accepts the means of attachment to the structure of the aircraft, in this instance the platform 2. The second plates 20 are secured to said second element of the beam that accepts the means of attachment to the turbine engine, in this instance the arms 3, 4 and 5.

In the exemplary embodiment depicted in the figures, each of the plates is extended in such a way as to form part of the first and the second element respectively. The plates 10 and 20 respectively are joined together by bolts 13 and 14 that are depicted in FIG. 1. This embodiment is not, however, the only possible embodiment. The plates may for example be produced by machining from two blocks. Yet other solutions are conceivable.

In operation, loads in the directions OZ and OY are transmitted parallel to the plates through the layers of elastomer which are subjected to shear stress. This arrangement prevents the elastomeric material from working in depression. The beam has greater rigidity along the engine axis OX. It may be possible to prestress the layers of elastomer in this direction by compressing the layers axially when the beam is being assembled.

It will be appreciated that the number of plates is not limited to the number in the embodiment illustrated here. It is dependent on parameters such as the space available in which to house the suspension, the overall cross sectional area of active elastomeric material required, the loads that the suspension will have to be able to withstand, the amount of vibration damping that is to be applied to the suspension. The cost of manufacturing such a structure is another parameter taken into consideration when designing the various components of the beam.

This structure is manufactured by pouring an elastomer for example into the gaps between the plates so that it adheres to these plates in a way known in the art of manufacturing laminated metal/elastomer structures.

According to another feature of the invention, one or two axial rods 11 or 12 are incorporated into the beam and pass through all the plates. These rods are mounted with some clearance in the plates 10 and 20. Their function is to transmit loads in the OZ and OY directions if the plates 10 and 20 shift relative to one another by more than a limiting amount that is acceptable, particularly in terms of safety, and which is defined by said clearance. It is possible to provide just one rod 11 or 12 if the suspension is not involved in reacting engine torque loads.

The number and surface area of the plates are dependent on the loads that are to be filtered and on the limit loads that a structure such as this is able to withstand.

The invention claimed is:

1. A suspension for suspending a turbine engine from the structure of an aircraft, comprising:
    a beam, the beam including
        a first element including a first attachment unit which attaches the beam to said structure,
        a second element including a second attachment unit which attaches the beam to the turbine engine,
        a first plate attached to the first element, the first plate being positioned transverse to an axis of the engine,
        a second plate attached to the second element, the second plate being positioned transverse to the axis of the engine, and
        a layer of a flexible and damping material positioned transverse to the axis of the engine and sandwiched between the first plate and the second plate,
    wherein a first face of the layer of the flexible and damping material abuts a first face of the first plate and a second face of the layer of the flexible and damping material, opposite the first face, abuts a first face of the second plate, and wherein the second attachment unit includes at least one link rod articulated by a ball joint to the second element of the beam.

2. The suspension as claimed in claim 1, wherein said flexible and damping material is an elastomer, and the beam comprises a plurality of parallel plates joined together by the bonding of layers of elastomer, a first set of the parallel plates are secured to the first element and a second set of the parallel plates are secured to the second element.

3. The suspension as claimed in claim 2, wherein the layer of elastomer is prestressed.

4. The suspension as claimed in claim 1, wherein said first and second plates are bolted together.

5. The suspension as claimed in claim 1, wherein at least one rod parallel to the axis of the engine passes through the first and second plates, a clearance is provided between the first and second plates and the rod, and the rod transmits loads perpendicular to the engine axis when the first plate shifts relative to the second plate.

6. A turbine engine comprising a suspension as claimed in claim 1.

7. The suspension as claimed in claim 1, wherein the second element includes at least one arm which extends in a downward direction and the at least one arm includes a transverse slot.

8. The suspension as claimed in claim 7, wherein a spindle passes through the transverse slot and the at least one link rod is articulated to the spindle by the ball joint.

9. The suspension as claimed in claim 1, wherein the first attachment unit includes an upper platform provided with a plurality of holes.

10. The suspension as claimed in claim 9, wherein a central stud is secured to the upper platform, the central stud cooperates with the structure of the aircraft and reacts shear loads between the suspension and the structure.

* * * * *